United States Patent
Van Gong

(10) Patent No.: US 6,370,565 B1
(45) Date of Patent: Apr. 9, 2002

(54) METHOD OF SHARING COMPUTATION LOAD WITHIN A DISTRIBUTED VIRTUAL ENVIRONMENT SYSTEM

(75) Inventor: Hubert Le Van Gong, Santa Clara, CA (US)

(73) Assignees: Sony Corporation of Japan, Tokyo (JP); Sony Electronics, Inc., Park Ridge, NJ (US)

(*) Notice: Subject to any disclaimer, the term of this patent is extended or adjusted under 35 U.S.C. 154(b) by 0 days.

(21) Appl. No.: 09/260,792

(22) Filed: Mar. 1, 1999

(51) Int. Cl.[7] .............................................. G06F 15/16
(52) U.S. Cl. ...................................... 709/205; 709/105
(58) Field of Search ................................ 709/105, 204, 709/205, 220, 223, 208; 345/419, 423

(56) References Cited

U.S. PATENT DOCUMENTS

| | | | | |
|---|---|---|---|---|
| 5,815,156 A | * | 9/1998 | Takeuchi ..................... | 345/419 |
| 5,832,229 A | * | 11/1998 | Tomoda et al. ............. | 709/220 |
| 5,956,028 A | * | 9/1999 | Matsui et al. ............... | 345/419 |
| 6,151,027 A | * | 11/2000 | Yoo ............................. | 345/423 |
| 6,175,842 B1 | * | 1/2001 | Kirk et al. ................... | 345/419 |
| 6,226,669 B1 | * | 5/2001 | Huang et al. ............... | 709/204 |

OTHER PUBLICATIONS

Raverdy, "DART Documentation (v1.7)", Nov. 16, 1998, Sony Computer Science Laboratory.

Amano et al., "Lead++: An Object–Oriented Reflective Language for Dynamically Adaptable Software", Graduate School of Information Science, Japan Advanced Institute of Science and Technology, Japan.

Bakker et al., "Replicated Invocations in Wide–Area Systems", Department of Mathematics and Computer Sciences, Vrije Universiteit.

Kermarrec et al., "A Framework for Consistent, Replicated Web Objects" 1998, ICDCS '98, May 1998 Amsterdam.

Kleinoder et al., "Transparent and adaptable Object Replicating Using a Reflective Java", Sep. 1996, Computer Science Department Friedrich–Alexander–University.

Kuz et al., "Replicated Web Objects: Design and Implementation", Delft University of Technology, The Netherlands.

Melliar–Smith et al., "The realize middleware for replication and resource management", Department of Electrical and Computer Engineering, University of California, Santa Barbara.

(List continued on next page.)

*Primary Examiner*—Patrice Winder
(74) *Attorney, Agent, or Firm*—Wagner, Murabito & Hao LLP

(57) ABSTRACT

A method of sharing computation load within a distributed virtual environment system. According to the present invention, entities within a virtual environment are gathered in groups based on their interactions. All the entities that can potentially interact together are gathered in one group based on the Area of Interest (or aura) of each entity. The groups are then mapped onto the available servers of the network. Once a group is mapped to a server, the server will become responsible for managing interaction between the entities of the group. In addition, a server has to perform collision detection for the entities of the group associated with it. According to the present invention, the server is also responsible for replicating the interaction group it manages so that every client related to the group can see all the entities within this group. Thus, by mapping the groups to the server, computation load can be evenly distributed among the servers. Further, by sharing computation load based on interaction groups, a very large number of clients can be simultaneously connected to the virtual environment system.

21 Claims, 9 Drawing Sheets

OTHER PUBLICATIONS

Noble et al., "Agile Application–Aware Adaptation for Mobility", 1997, School of Computer Science, Carnegie Mellon University.

Olivia et al., "Composition of Meta–Objects in Guarana", Instituto de sistemas Distribuidos, Universidade Estadual de Campinas.

Satyanarayanan et al., "Application–Aware Adaptation for Mobile Computing", School of Computer Science, Carnegie Mellon University.

Welch et al., "Dalang– A Reflective Java Extension", University of Newcastle upon Tyrne, United Kingdom.

Wu, "Reflective Java and A Reflective Component–Based Transaction Architecture", Poseidon House, Castle Park, Cambridge.

Lea et al., "Issues in the design of a scaleable shared virtual environment for the Internet", Jan. 7, 1997, Hawaii International Conference on System sciences, Miami, HI.

Frecon et al., "DIVE: a scaleable network architecture for distributed virtual environments", Mar. 6, 1998, Swedish Institute of Computer Science.

Abrams et al., "Three–Tiered Interest Management for Large–Scale Virtual Environments", Computer Science Department, Naval Postgraduate School, Monterey, California.

* cited by examiner

METHOD OF SHARING COMPUTATION LOAD WITHIN A DISTRIBUTED VIRTUAL ENVIRONMENT SYSTEM

FIELD OF THE INVENTION

The present invention pertains to the field of computer networks. More specifically, the present invention pertains to the field of distributed architectures for virtual reality environment systems.

BACKGROUND OF THE INVENTION

Development in software technology has allowed computers to perform a wide variety of useful operations. Depending on the software which is installed within their particular memory storage devices, computers can be used for many purposes. For example, they can be used to manage numerous financial transactions of a bank, control the fabrication of items ranging from automobiles to integrated circuit chips, store addresses and telephone numbers of acquaintances, analyze scientific and engineering data, produce and edit documents along with transmitting and receiving data.

The functionality and usefulness of a computer system is further enhanced by the promulgation of the Internet. The Internet is a worldwide collection of computer networks and gateways that generally use the TCP/IP suite of protocols to communicate with one another. Millions of people use the Internet for communication and entertainment. The Internet allows easy access to media and data from a variety of sources, and is capable of delivering this information to the users wherever they may be. Further, the Internet can support a high degree of interaction, allowing the users to interact with other users and to carry out useful work with others even when they are geographically remote.

The promulgation of the Internet has also spawned interests in developing virtual reality systems that allow many users to participate and interact with each other in a shared three-dimensional (3D) virtual environment. In response to such interests, a shared, multi-user virtual environment system targeted at personal computer platforms with low-speed connection to the Internet has been developed by the Sony Corporation. The purpose of Sony's virtual environment system (known as Community Place or CP) is to provide an efficient way for people to participate and interact in a 3D virtual world while being geographically dispersed.

FIG. 1 is a block diagram illustrating the architecture of Sony's Community Place (CP) system 100. The CP architecture adopts a client-server model. It is composed of the following components: a CP server 110 that consists of a database of objects existing in the 3D virtual world, and a number of CP clients 120a–120c connected to the CP server 110 for accessing contents of the database. The CP clients 120a–120c each includes a CP browser which can handle VRML files and web URLs for displaying the 3D virtual world, and for allowing users to navigate through the virtual world and to interact with other users and objects in the world.

Clients 120a–120c are connected to CP server 110 via the Internet 130. Communication between the clients 120a–120c and the CP server 110 is accomplished by using the Virtual Society Client Protocol (VSCP). This protocol has been designed to provide efficient virtual scene update information and support for script specific messages. As Community Place is designed for low-bandwidth Internet connections, the VSCP messages are made as compact as possible.

Each client 120a–120c is represented by an "entity" within the virtual world. The CP server 110 is mainly responsible for maintaining consistency between the clients 120a–120c, tracking position of entities, and forwarding messages coming from one client to the others. The position-tracking function of the CP server is accomplished by using a User Application Manager (UAM).

To reduce the computation load of the server 110, the Community Place architecture employs the notion of spatial area of interest (AOI). The Area of Interest (also called aura) represents a zone around an entity. The entity may interact with other entities located inside this aura. The benefit of this approach is that it decreases the number of messages to be sent in case of a modification. Indeed, only entities inside the aura of a particular entity receive update information concerning that particular entity. Thus, another function of the server 110 is to determine, using the aura manager, the set of entities to be notified of a modification in the virtual world. The aura manager also determines when a collision between two auras occur. As background, a more detailed description of the Community Place architecture can be found in a reference by Lea et al., entitled "Community Place: Architecture and Performance," VRML'97—2nd Symposium on the Virtual Reality Modeling Language, February 1997.

The CP system 100 is tremendously successful in providing access to a shared virtual environment to hundreds of clients simultaneously. However, current computer technology limits the number of clients that can be connected to the CP server 110. For instance, it has been shown that a CP server implemented on a Sun Sparc Ultra-Server model-170 can only handle approximately five hundred simultaneous connections. In addition, because clients may be geographically very far from each other, a single server is not an efficient solution as the low-bandwidth connection between a client 120a–120c and the CP server 110 can cause substantial latency and delay. As the number of clients increases, the number of messages on the network is also a concern. Further, the virtual worlds and their applications are becoming so complex that a single server can barely manage the necessary computations. Finally, a single server architecture is not fool-proof as a failure of this server would have dramatic consequences on the shared virtual world.

Beside Community Place, other distributed shared virtual environment systems have also been proposed. For example, NPSNET, developed by the U.S. Navy and described in a reference by Macedonia et al., entitled "Exploiting Reality With Multicast Groups," IEEE Computer graphics and Applications, Vol. 15, pp. 38–45, is a large-scale virtual environment and is intended to support military simulations that include tens of thousands of users. In NPSNET, the virtual world is partitioned in hexagons and a multicast group is associated to each of these hexagon. The NPSNET, however, is most efficient when the distribution of entities within the virtual world is homogenous. The NPSNET architecture, however, loses significant amount of efficiency when a large number of entities are located in the same hexagon.

Another well-known distributed virtual environment system is the DIVE system developed at the Swedish Institute of Computer Science, and described in a reference by Frecon et al., entitled "DIVE: A Scalable Network Architecture for Distributed Virtual Environments," Distributed System Engineering, Vol. 5, pp. 91–100. To remedy problems with network congestion and traffic overhead, the DIVE system provides a mechanism for dividing the virtual world into sub-hierarchies that are only replicated and used in between the applications that are actually interested in them.

Although only a portion of the virtual world database is replicated at each process, each host must nonetheless maintain the entire database. Thus, the DIVE architecture may not be suitable for a very large scale virtual environment.

Therefore, there exists a need for a more reliable architecture that is capable of handling a large scale virtual environment having a very large number of users. What is also needed is an architecture that is capable of handling large scale virtual environment without sacrificing complexity in the virtual worlds and application designs. What is yet further needed is an architecture for distributed virtual environment systems that is not based on geographical partitioning of the virtual environment.

SUMMARY OF THE INVENTION

A computer implemented process and system are described for distributing computation processes among a network of servers within a large scale shared virtual environment system. According to the present invention, entities within the virtual environment are gathered in groups based on their interactions. Entities that can potentially interact with each other are gathered in one group. In one embodiment of the present invention, the Area of Interest (or aura) of each entity is used as a means for identifying possible interactions between entities.

According to the present invention, the groups are mapped onto the available servers of the network. Once a group is mapped to a server, the server will become responsible for managing interaction between the entities of the group. In addition, a server has to perform collision detection and other computation intensive operations for the group that it manages. In addition, the server is responsible for replicating non-local entities of the interaction group it manages so that every user can see all the entities within his group. Thus, by mapping the groups to the server, computation load can be evenly distributed.

Embodiments of the present invention include the above and further include a computer implemented method of sharing computation load among the network of servers comprising the steps of: providing a shared multi-user virtual environment including a number of entities; and dynamically assigning each of the entities to a server of the network. According to the present embodiment, the step of dynamically assigning further includes the steps of: (a) collecting spatial information of the of entities from the servers; (b) forming a number of groups by grouping the plurality of entities based on the spatial information; (c) distributing computational load among the network of servers by mapping each interaction group to one of the network of servers. In the present invention, the steps (a) to (c) are repeated periodically such that consistency is maintained between the constituency of the groups and changes in the virtual environment.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE PREFERRED EMBODIMENTS

In the following detailed description of the preferred embodiments, for purposes of explanation, numerous specific details are set forth in order to provide a thorough understanding of the present invention. However, it will be apparent to one skilled in the art that the present invention may be practiced without these specific details. In other instances, well-known structures and devices are not described in detail in order to avoid obscuring aspects of the present invention.

I. Computer System Environment of the Present Invention

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here and generally conceived to be a self-consistent sequence of steps of instructions leading to a desired result. The steps are those requiring physical manipulations of data representing physical quantities to achieve tangible and useful results. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "collecting", "computing", "determining", "grouping", "mapping", "assigning" or the like, refer to the actions and processes of a computer system, or similar electronic computing device. The computer system or similar electronic device manipulates and transforms data represented as electronic quantities within the computer system's registers and memories into other data similarly represented as physical quantities within the computer system memories into other data similarly represented as physical quantities within the computer system memories or registers or other such information storage, transmission, or display devices.

Figure 1:
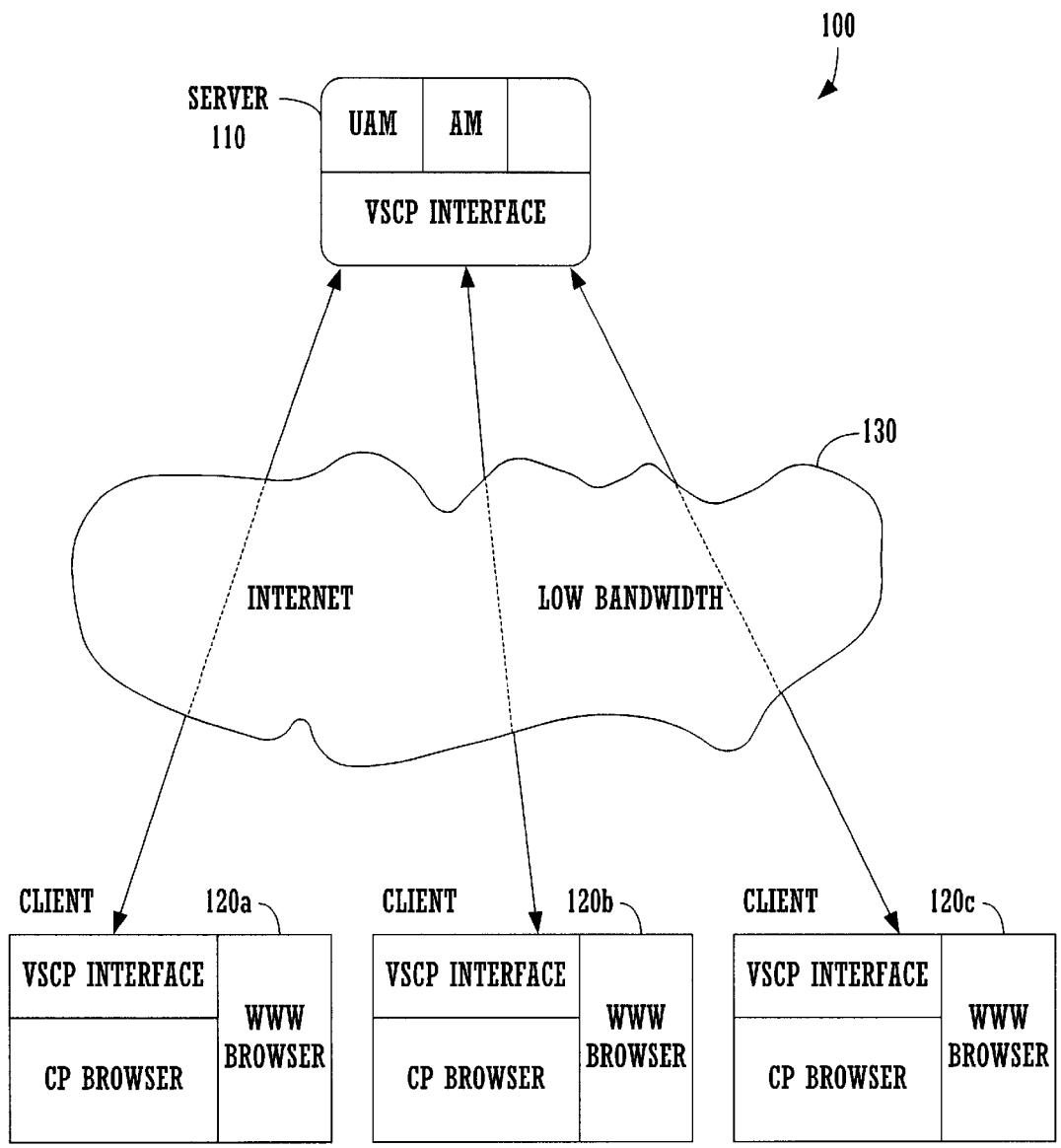
FIG. 1 is a logical block diagram of a virtual environment simulation system called Community Place (CP).
Figure 2:
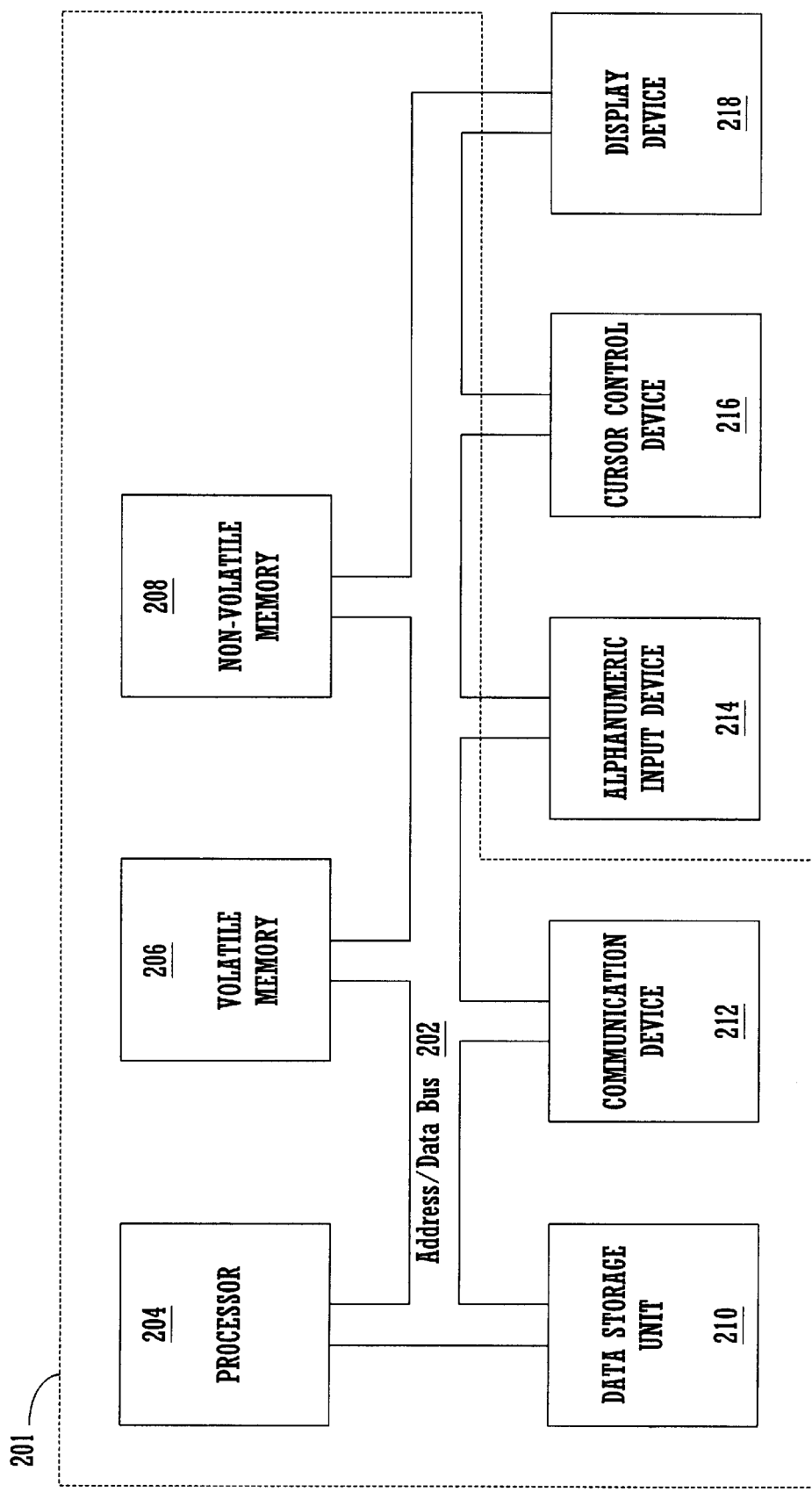
FIG. 2 is a logical block diagram of a computer system operable to implement elements of the present invention.

Specific aspects of the present invention are operable within a distributed virtual environment system, or more specifically, a Distributed Community Place (DCP) system. In general, a server for the DCP system in accordance with the present invention includes a general purpose computer system 201 operable as a platform to implement and support elements of the present invention. As shown in FIG. 2, computer system 201 includes an address/data bus 202 for communicating information including address, data, and control signals, a central processor 204 coupled with bus 202 for processing information and instructions, a volatile memory 206 (e.g., random access memory RAM) coupled with the bus 202 for storing information and instructions for the central processor 204 and a non-volatile memory 208 (e.g., read only memory ROM) coupled with the bus 202 for storing static information and instructions for the processor 204, a data storage device 210 such as a magnetic or optical disk and disk drive coupled with the bus 202 for storing information and instructions, an optional display device 218 coupled to the bus 202 for displaying information to the computer user, an optional alphanumeric input device 214 including alphanumeric and function keys coupled to the bus 202 for communicating information and command selections to the central processor 204, an optional cursor control or directing device 216 coupled to the bus 202 for communicating user input information and command selections to the central processor 204, and a communication device 212 coupled to the bus 202 for communicating signals that are input and output from the system 201.

Program instructions executed by the DCP server can be stored in computer usable memory units such as RAM 206, ROM 208, or in the storage device 210, and when executed in a group can be referred to as logic blocks or procedures. It is appreciated that data produced at the various stages of the present invention, including representations of the users and objects in the virtual environment, can also be stored in RAM 206, ROM 208 or the storage device 210 as shown in FIG. 2.

The display device 218 of FIG. 2 utilized with the computer system 201 of the present invention is optional and may be a liquid crystal device, cathode ray tube, or other display device suitable for creating graphic images and alphanumeric characters recognizable to the user. The cursor control device 216 allows the computer user to dynamically signal the two dimensional movement of a visible pointer on a display screen of the display device 218. Many implementations of the cursor control device are known in the art including a trackball, mouse, joystick or special keys on the alphanumeric input device 214 capable of signaling movement of a given direction or manner of displacement.

Figure 3A:
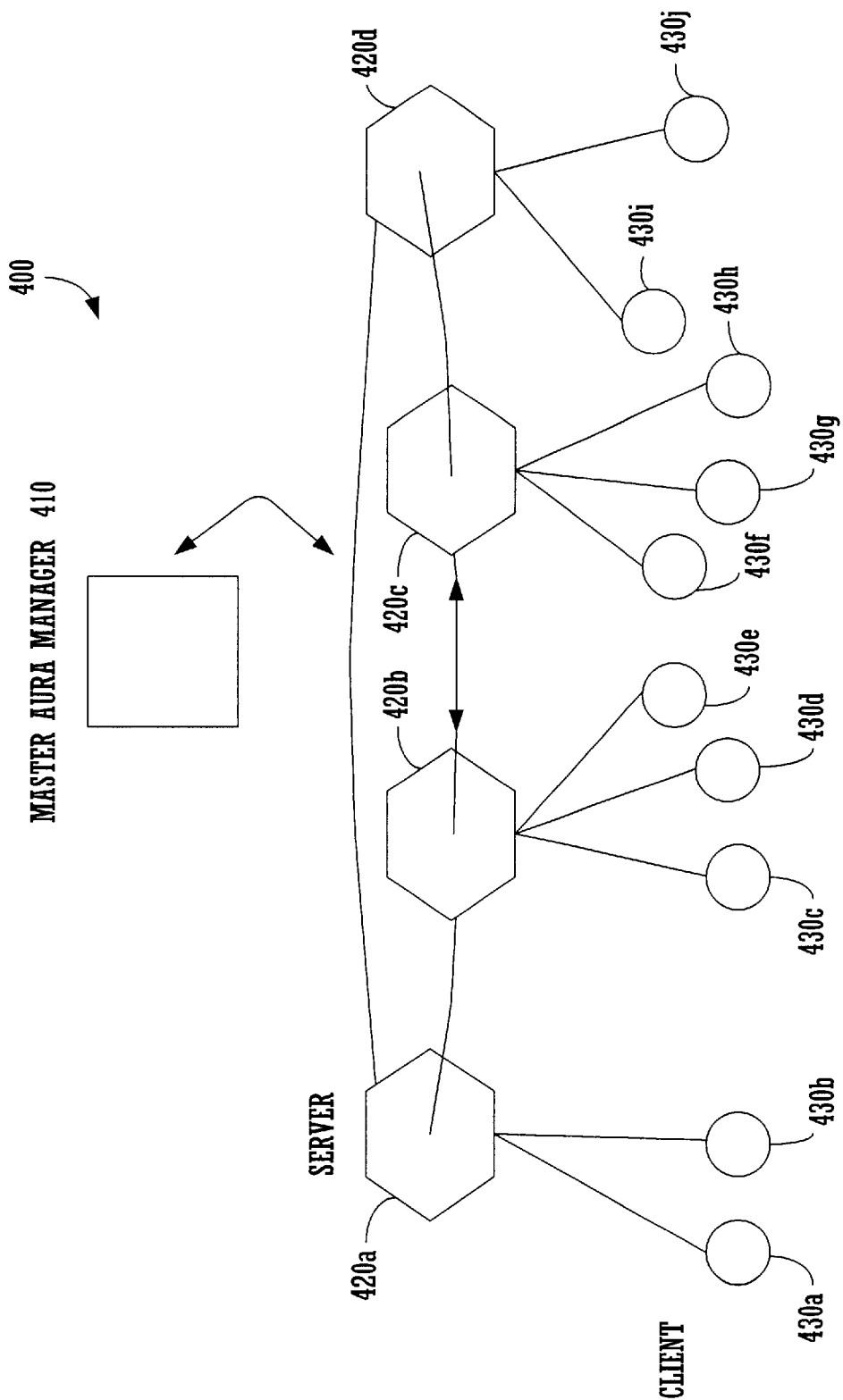
FIG. 3A is a block diagram illustrating the physical connections between clients and servers in the distributed virtual environment system according to the present invention.

II. Method of Distributing Computation Load Among Servers of the Distributed Virtual Environment System According to the Present Invention FIG. 3A is a logical block diagram illustrating an exemplary distributed virtual environment system 400 in accordance with the present invention. As illustrated, the distributed environment system 400 is based on a distributed server/client model, and includes a cluster of server computers (servers) 420a–420d, and a plurality of client computers (clients) 430a–430j coupled to the servers 420a–420d. In the illustrated embodiment, clients 430a–430b are directly connected to server 420a, clients 430c–430e are directly connected to server 420b, clients 430f–430h are directly connected to server 420c, and clients 430i–430j are directly connected to server 420d. The cluster of servers 420a–420d may be connected to each other via high speed connections. However, it should be noted that the present distributed virtual environment system 400 may also be implemented in various wide area networks and that the servers 420a–420d may be geographically remote.

According to the present invention, each server 420a–420d maintains a database of objects contained in the same shared three-dimensional (3-D) virtual world (hereinafter "virtual world"). Clients 430a–430j each includes a browser (e.g., Microsoft Internet Explorer, Netscape Navigator or the SONY Community Place Browser) which is capable of handling VRML (Virtual Reality Modeling Language) and Web URLs (Uniform Resource Locators) for displaying the virtual world. In addition, the browsers allow users of system 400 to navigate through the virtual world, and to interact with other users and objects within the virtual world. In present embodiment, the browsers are connected to the servers 420a–420d using the VSCP (Virtual Society Client Protocol), which is a special protocol optimized to support viewing of 3D environments with minimal data exchange.

According to the present invention, clients 430a–430j are represented as "entities" in the virtual world, and that the users are able to "see" each other (e.g., other entities) in the virtual world through browser software implemented on clients 430a–430j. Significantly, in the present invention, entities are gathered in groups based on their interaction. All entities that can potentially interact together are gathered in one group called an interaction group. In a very large scale virtual world, the entities can be divided into a large number of interaction groups. In one embodiment of the present invention, interaction groups are created using an Area of Interest (or aura) surrounding each entity as a means for identifying possible interactions between entities.

After the interaction groups are created, they are mapped onto the servers 420a–420d. Mapping can be based on the current computation load on the servers 420a–420d and the number of "local" connections each server has. The software process in charge of dividing entities into interaction groups and mapping interaction groups onto the servers 420a–420d is called the Master Aura Manager (master AM) 410. Particularly, the master AM 410 periodically receives position information of the entities from the servers 420a–420d, and periodically divides the entities into different groups based on the position information. Based on the position information, the master AM 410 dynamically maps the different entities onto different servers 420a–420d.

In the present invention, once an interaction group is mapped to a server, the server will become responsible for managing the entities of that group. In other words, the server will become the "logical" server of the entities of that interaction group. The "logical" server of an entity, however, may not be directly connected to the client represented by that entity. For example, client 430c is directly connected to its server 420b. Thus, for the entity representing client 430c, server 420b is a "physical" server. However, the entity representing client 430c may be part of an interaction group that is managed by server 420a. In that case, the server 420a becomes the "logical" server of that entity. The logical server provides collision detection for the entities of that interaction group, and also updates the parts of the world database that are pertinent to that interaction group. An important advantage of mapping interaction groups to different logical servers is that computation load can be evenly distributed among the servers.

Figure 3B:
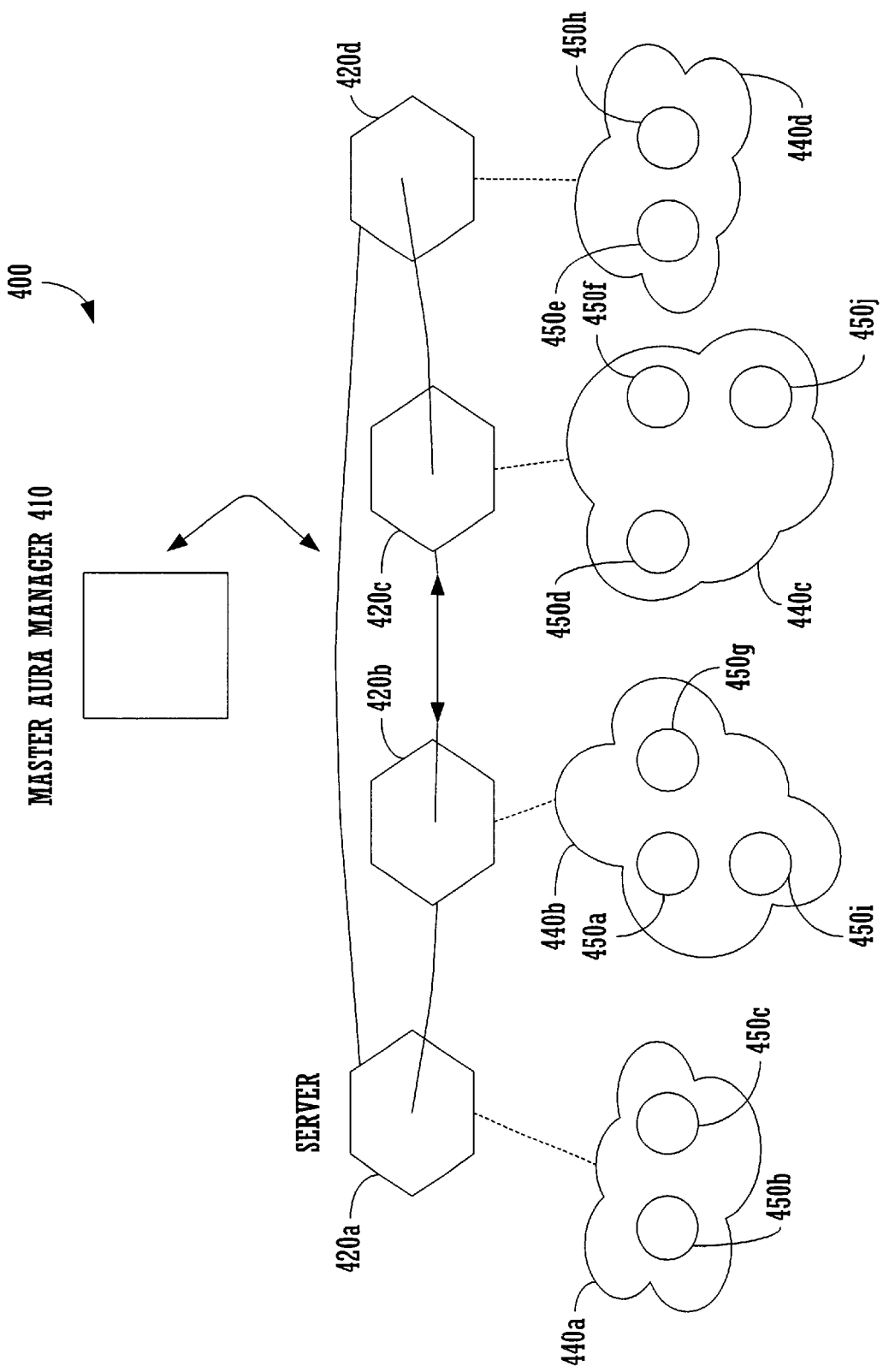
FIG. 3B is a logical block diagram illustrating the logical group assignments in the distributed virtual environment system of FIG. 3A.

FIG. 3B is a logical block diagram illustrating the logical group assignments in the distributed virtual environment system 400 of FIG. 3A. As illustrated, interaction group 440*a*, consisting of entities 450*b* and 450*c* (representing clients 430*b* and 430*c*), is mapped to server 420*a*. Interaction group 440*b*, consisting of entities 450*a*, 450*g* and 450*i* (representing clients 430*a*, 430*g* and 430*i*), is mapped to server 420*b*. Interaction group 420*c*, consisting of entities 450*d*, 450*f* and 450*j* (representing clients 430*d*, 430*f* and 430*i*), is mapped to server 420*c*. Finally, interaction group 420*d*, consisting of entities 450*e* and 450*h* (representing clients 430*e* and 430*h*), is mapped to server 420*d*. As discussed above, computation intensive processes pertinent to an interaction group, such as collision detection, are performed by the "logical" server of the interaction group. Accordingly, computation load can be evenly distributed among several servers.

Figure 4:
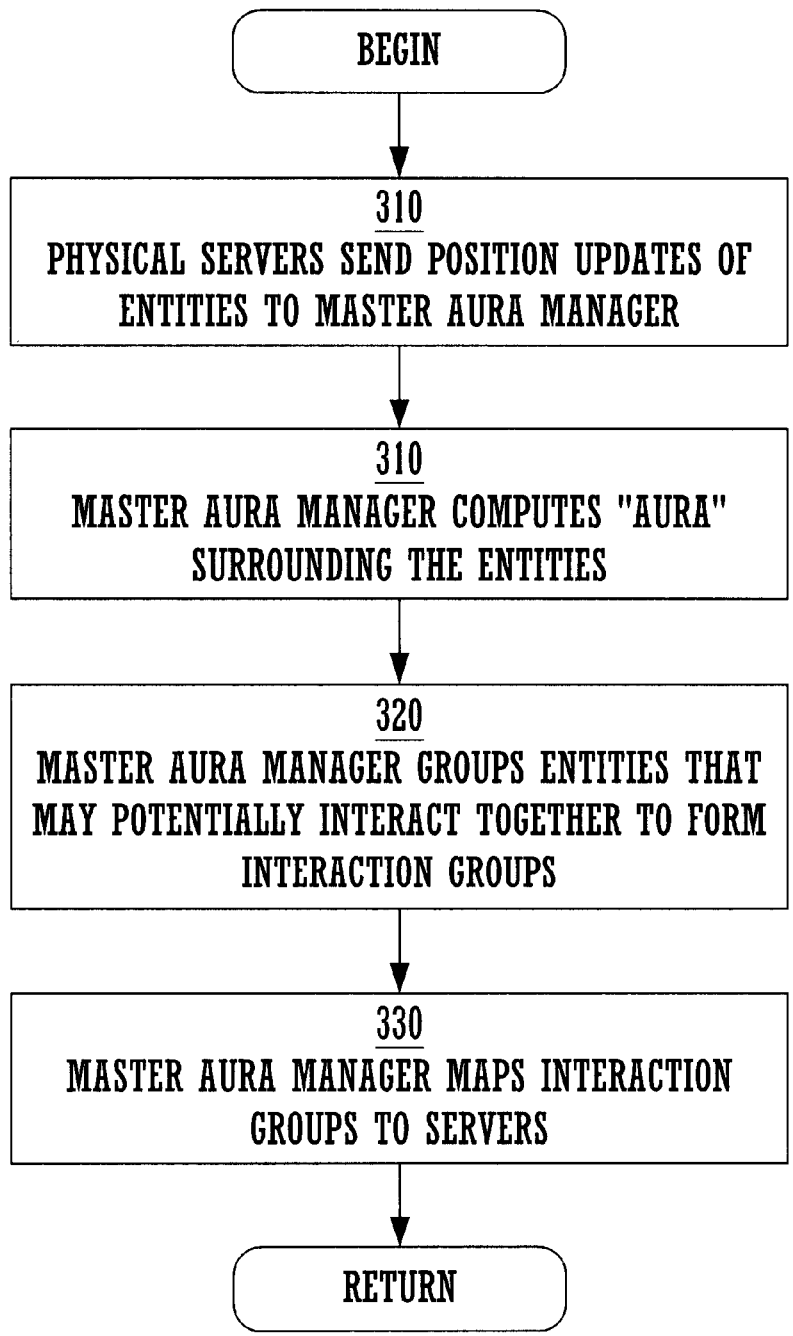
FIG. 4 is a flow chart diagram illustrating the steps of distributing computation load among servers of the distributed virtual environment system according to the present invention.

FIG. 4 is a flow diagram illustrating steps of a process 300 implemented on system 201 for sharing computation load in a distributed virtual environment system (e.g., system 400) according to the present invention. As illustrated, the process 300 begins at step 310 where the servers of the distributed virtual environment system send position information of the entities to a Master Aura Manager (e.g., master AM 410). In the present invention, the "physical" servers of the entities are responsible for sending position information of that entity to the master AM.

After receiving the position information of the entities, the master AM then computes the Area of Interest, or aura, surrounding each entity at step 320. According to the present invention, an aura represents a zone surrounding a particular entity. That particular entity may interact with other entities located inside its aura. Entities outside of the aura, however, are considered to be non-interactive with that particular entity. In the present invention, auras are used as a means for controlling spatial interaction. However, it should be noted that an aura can be concerned not simply with space but also with aural or sensory interaction. Thus, the present process 300 may use visual auras and/or aural auras. In addition, the auras may be dynamic. For example, when a user enters a crowded room, then it is likely that they would wish to reduce their visual aura to cut down on the among of information they need to be concerned with. It would also be advantageous to decrease the size of the aura in order to reduce the degree of interaction to minimize the amount of consistency that must be supported.

At step 320, entities are divided into interaction groups based on their interaction by the master AM. All entities that can potentially interact together are gathered in one interaction group. By splitting the entities in groups, the computation load on each server is reduced, thus allowing more clients to be connected at the same time.

Table 1 illustrates, in pseudocode form, a software process of composing interaction groups in furtherance of the present invention. According to Table 1, one entity is first chosen and then all the entities located within its aura are added to the group. These steps are repeated until no more entity is added to the group. One advantage of this software process is that overlapping between groups is prevented: an entity belongs to only one interaction group. It should be noted that because of the flexible architecture of the present invention, it is entirely possible to design other more complicated software processes to compose interaction groups.

TABLE 1

```
*******************************************
procedure one_pass (list of entities L)
{
    Select an entity e in L and transfer it in a
        new group G
    Transfer all the entities from L which are in
        the aura of e in G
    Do
        For each entity e' in G
            Transfer all the entities from L which are
                in the aura of e' in G
    Until there's no more entity to add to G
}
*******************************************
```

Figure 5:
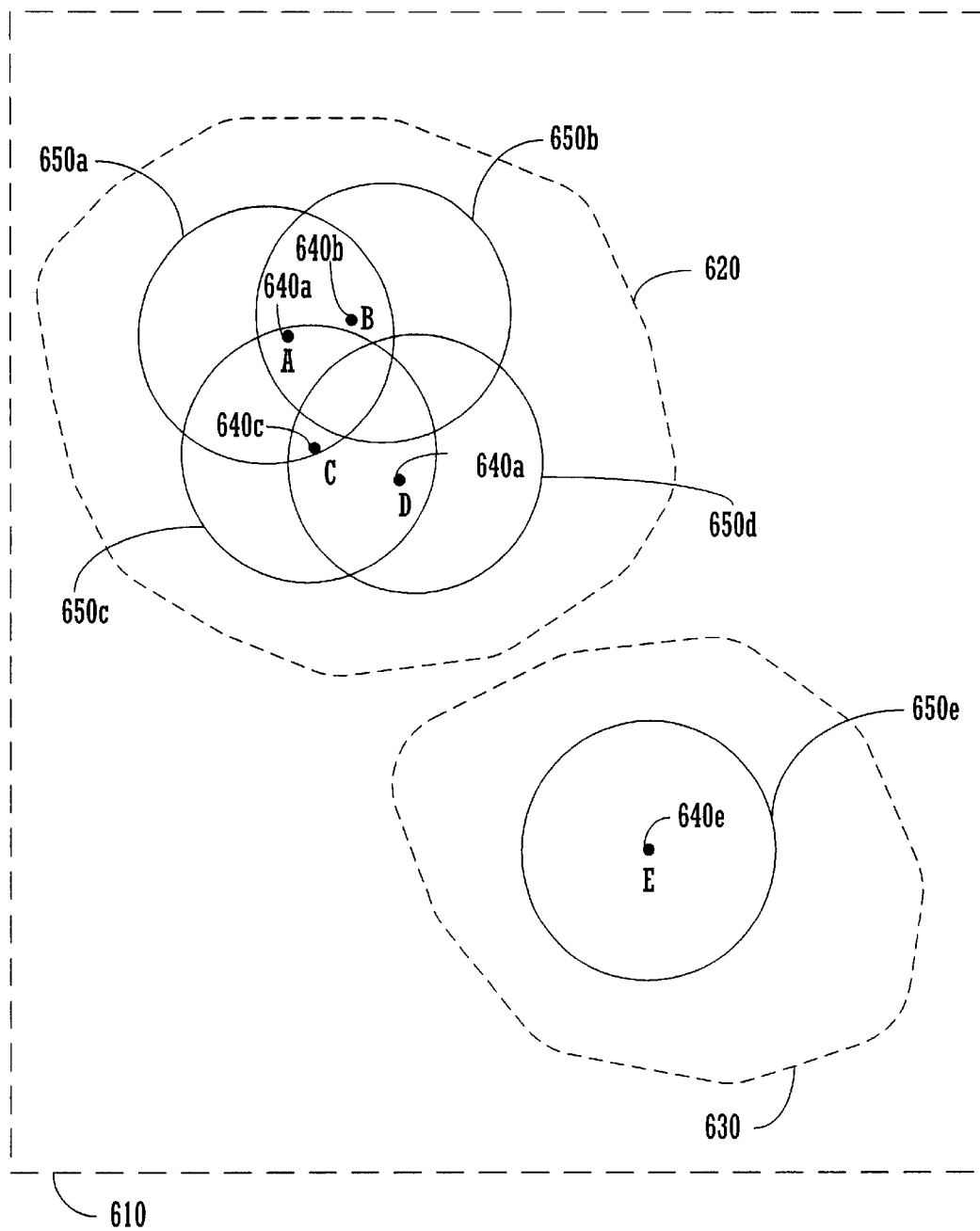
FIG. 5 is a logical block diagram illustrating an exemplary group composition within the virtual environment in accordance with the present invention.
Figure 6:
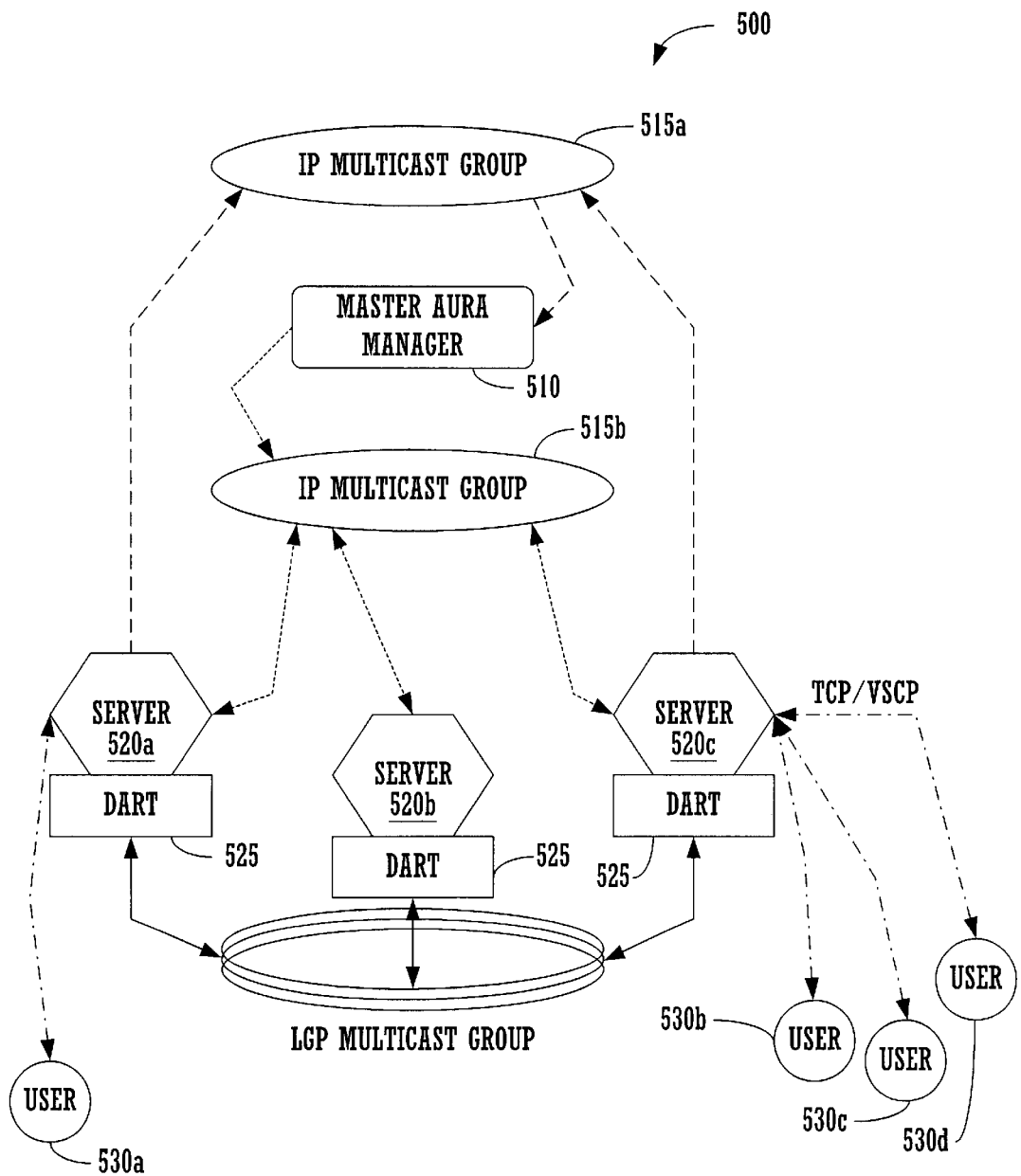
FIG. 6 is a logical block diagram illustrating the communication and replication mechanisms of a distributed virtual environment system according to one embodiment of the present invention.

FIG. 5 illustrates is a logical block diagram 600 illustrating an exemplary group composition process within a virtual world 610 in accordance with the present invention. It should be noted that the group composition process shown in FIG. 5 is in accordance with the software process of Table 1. As illustrated in FIG. 5, the virtual world 610 includes five entities 640*a*–640*e* each representative of a client of a virtual environment system such as system 400. Each entity 640*a*–640*e* includes an Area of Interest (or aura) 650*a*–650*e*. In the embodiment as illustrated in FIG. 6, auras 650*a*–650*e* are defined as spherical zones surrounding the entities 640*a*–640*e*. Using the process illustrated in Table 1, if entity 640*a* is first chosen, then entities 640*b* and 640*c* will be immediately grouped together to form interaction group 620. Then, entity 640*d* is added to the same interaction group 620 because it is located within the aura 650*c* of entity 640*c*. Entity 640*e*, however, is not added to interaction group 620 because it is not located within auras 650*a*–650*d*. Therefore, entity 640*e* constitutes another interaction group 630.

With reference again to FIG. 4, interaction groups (e.g., interaction groups 620 and 630) are mapped to different servers of the virtual environment system by the master AM at step 330. According to the present invention, several parameters may be used in determining whether an interaction group will be mapped to a particular server. One of those parameters is the computation load of the server. When a server is almost overloaded, it should not receive any more groups to manage. In one embodiment of the present invention, each server periodically sends its current CPU usage to the master AM which can then distribute smaller groups to the most heavily loaded servers.

In another embodiment of the present invention, group distribution is based on the number of "local" or "direct" connections of the server. When a group is managed by a server, only several of the entities are representing locally connected clients. The remaining entities of the group are representing remotely connected clients. It should be appreciated that the larger the number of local users, the smaller the network latency, the faster the user-interactions will be reflected on the clients. Thus, an interaction group is preferably mapped to a server that has the most local connections.

It should also be appreciated that other mapping policies, such as mapping one group after another to the list of available servers, can also be applied. It should also be appreciated that several mapping policies can be applied at step 330 to optimize the mapping process.

According to the present invention, the process 300 of FIG. 4 is repeated periodically. Particularly, the master AM re-computes the group distribution and updates the servers of the group distribution every Δt seconds. In this way, the interaction groups are dynamically maintained. This feature takes into account the fact that entities are constantly moving within the virtual world, and avoids the problem of overloading a particular server when all the entities have moved close to each other. In one particular embodiment, the master AM recomputes the group distribution and updates the servers every fifteen seconds. However, this time value (Δt) is programmable. In addition, the radius of the aura can also be adjusted to provide for an even larger degree of flexibility and configurability.

III. Communication and Entities Replication Mechanisms of the Present Distributed Virtual Environment System FIG. 6 is a logical block diagram illustrating the communication and replication mechanisms of a distributed virtual environment system 500 according to one embodiment of the present invention. As illustrated, distributed virtual environment system 500 includes a cluster of servers 520a–520c, a plurality of clients 530a–530d connected to the servers 520a–520c, and a master aura manager (master AM) 510 for grouping entities and for mapping different groups to different servers 520a–520c. Communications between the clients 530a–530d and servers 520a–520c rely on the TCP (Transmission Control Protocol) and the VSCP (Virtual Society Client Protocol) protocols. By using these communication protocols, the present distributed virtual environment system 500 is backward-compatible with browsers previously developed for Community Place. Communication between the servers 520a–520c and the master AM 510 are ensured by using two one-way IP-multicast (Internet Protocol multicasting) groups 515a-515b. By using two one-way IP-multicast groups 515a–515b, the number of messages to be treated by the servers 520a–520c can be significantly reduced.

As illustrated in FIG. 6, Client 530a is directly connected to server 520a, and clients 530b–530d are directly connected to server 520c. Thus, server 520a is the "physical" server for the entities associated with client 530a, and server 520c is the "physical" server for the entities associated with clients 530b–530d. If an interaction group containing entities associated with clients 530a–530d is assigned to server 520b, then server 520b becomes the "logical" server for those entities.

According to the present invention, a user can only "see" other entities which exist on the same physical server. That is, only the entities that exist on the same physical server as the client will be drawn by the browser of that client. Thus, in order to make entities within the same interaction group visible to one another, each server associated with the interaction group has to be aware of all the entities in the group. Therefore, each server has to replicate all the non-local entities of the groups that it manages. For example, the entity associated with client 530a is assigned to an interaction group that is managed by server 520b. Suppose the interaction group also contains entities that are associated with clients 530b–530d. Thus, in order to enable all the entities to see each other, server 520c has to create a replica of the entity associated with client 530a. Server 520a also has to create replicas of the entities associated with clients 530b–530d.

With respect to entity replication, the Distributed Adaptive Run-Time (DART) software platform is used replicate entities within the present distributed virtual environment system 500. The DART layer is represented by logical blocks 525 in FIG. 6. According to the present invention, the DART layer 525 is responsible for facilitating replication on servers 520a–520c. In the present embodiment, the DART layer 525 uses a multicast package called LGP (lightweight group protocol) which offers multi-cast group multiplexing over IP-multicast.

Generally, the DART platform is an object-oriented platform designed for developing distributed software applications which are aware of their execution environment and thus are capable of adapting at run-time. The DART platform relies on the use of a meta-object programming model which enables the platform to provide a clean set of mechanisms for adaptive programs and to provide an interface to parameterized adaptation policies at run-time. One benefit of this approach is to enable adaptation when developing an application for a changing environment (e.g., a video-conferencing application over a network with varying bandwidth). Another benefit of using the DART platform is that it avoids the re-writing of an existing application that has to be used in a new environment.

Particularly, the DART platform provides support for two adaptation mechanisms: adaptive methods and reflective methods. Adaptive methods allow different implementations of an object's method to be chosen at run-time; and reflective methods extend an object with general properties without changing the object's implementation.

Figure 7A:
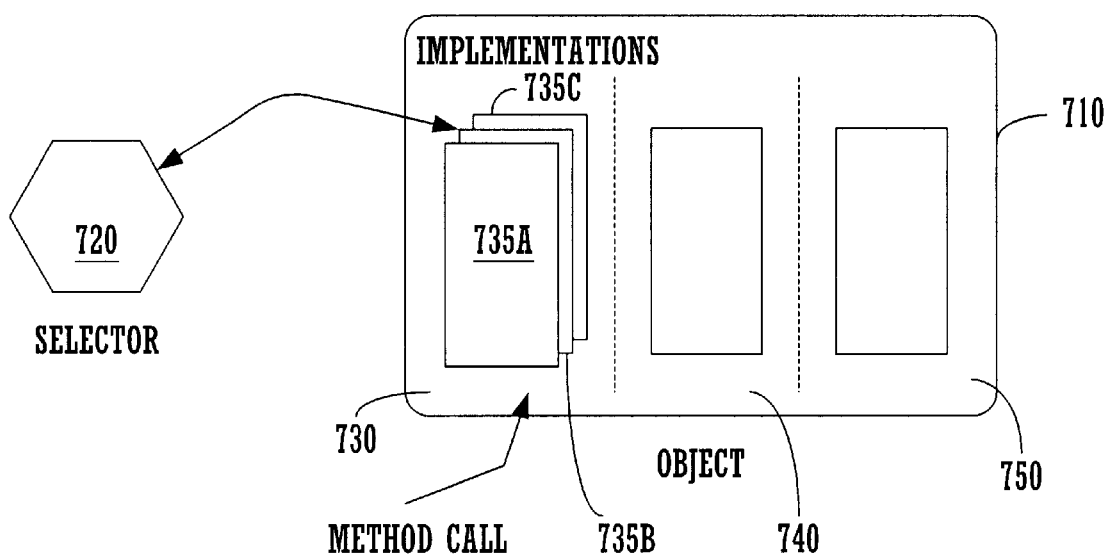
FIG. 7A is a logical block diagram illustrating one adaptive mechanism of a Distributed Adaptive Run-Time (DART) platform used by one embodiment of the present invention.

FIG. 7A illustrates the first adaptation mechanism provided by the DART platform. As illustrated, an object 710 includes an adaptive method 730, a reflective method 740, and a non-adaptive method 750. Adaptive method 730 includes multiple implementations 735a–735c. In operation, after a method call to the adaptive method 730, a selector 720 (provided by the DART platform) chooses one of the multiple implementations 735a–735c based on the execution environment of the object 710. Thus, the programmer can provide several implementations 735a–735c of the same method 730 to enable the object 710 to adapt at run-time.

Figure 7B:
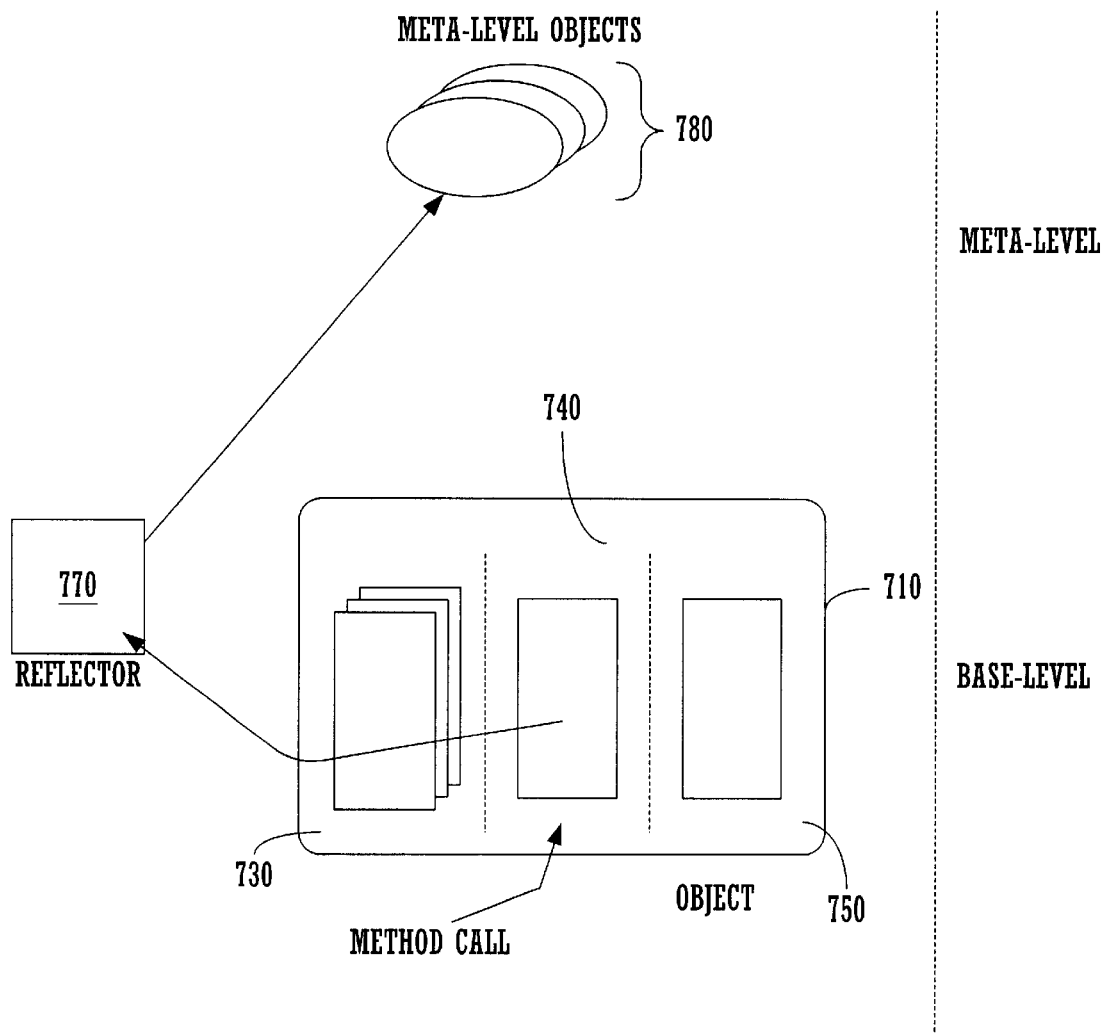
FIG. 7B is a logical block diagram illustrating another adaptive mechanism of the DART platform used by another embodiment of the present invention.

FIG. 7B illustrates the second adaptation mechanism provided by the DART platform. As illustrated, when the reflective method 740 is called, a reflector 770 (provided by the DART platform) calls associated meta-objects 780 to perform relevant operations. These meta-objects 780 are designed independently of the application and perform general platform services such as replication. After the meta-objects 780 have performed the relevant operations, the reflector 770 then triggers the method 740 itself.

It should be appreciated that, the DART platform hides complicated programming details of distribution technology and replication technology from the application developers. To this end, a DART compiler is also provided. The DART compiler translates high level keywords contained in the program source code provided by the programmer, and automatically generates all the necessary and complicated program codes needed to manage multiple implementations and meta-spaces and their adaptation needs. A more detailed description of the DART platform can be found in co-pending US patent applications by Raverdy et al., entitled "Process and System for Managing Run-Time Adaptation for General Purpose Distributed Adaptive Applications," Ser. No. 09/258,020, and entitled "Process and System for Developing an Application Program for a Distributed Adaptive Run-Time Platform," Ser. No. 09/258,047 both filed on Feb. 25, 1999, which are hereby incorporated by reference.

The present invention, a method of sharing computation load within a distributed virtual environment system, has thus been disclosed. It should be appreciated that, while the present invention has been described in particular embodiments, the present invention should not be construed as limited by such embodiments, but rather construed according to the below claims.

What is claimed is:

1. In a computer controlled distributed virtual reality system implemented on a network of servers, a computer implemented method of sharing computational load among said network of servers comprising the steps of:

providing a shared multi-user virtual environment comprising a plurality of entities, wherein said entities each represents one of a plurality of clients within said shared multi-user virtual environment, and wherein said plurality of clients are physically connected to said network of servers; and dynamically assigning each of said entities to a server of said network, said step of dynamically assigning further comprising the steps of:

(a) collecting spatial information of said plurality of entities from said network of servers, said spatial information comprising a location of each entity within said shared multi-user virtual environment;

(b) forming a plurality of interaction groups by grouping said plurality of entities based on said spatial information; and (c) distributing computational load among said network of servers by mapping each interaction group to a respective one of said network of servers.

2. The computer implemented method as recited in claim 1 further comprising the step of periodically repeating said steps (a) to (c) at a user-adjustable interval.

3. The computer implemented method as recited in claim 2 wherein said step (b) further comprises the steps of:

determining an aura surrounding each one of said plurality of entities; and assigning entities having overlapping auras to a same interaction group.

4. The computer implemented method as recited in claim 3 further comprising the step of increasing a number of said plurality of interaction groups by decreasing a size of said aura.

5. The computer implemented method as recited in claim 2 wherein said step (b) further comprises the steps of:

computing a distance between a first entity and a second entity of said plurality of entities within said shared multi-user virtual environment;

assigning said first entity and said second entity to a same interaction group provided said distance is smaller than a predetermined threshold; and assigning a third entity of said plurality to said same interaction group provided a distance between said second entity and said third entity is smaller than a predetermined threshold.

6. The computer implemented method as recited in claim 2 wherein said step (c) further comprises the steps of:

determining computation loads for said servers; and assigning interaction groups to said servers according to said computation loads.

7. The computer implemented method as recited in claim 2 wherein said step (c) further comprises the step of mapping one interaction group to a selected one of said plurality of servers provided said selected server is directly connected to clients associated with said one interaction group.

8. In a distributed virtual reality system implemented on a network of servers, a computer implemented method of sharing computational load among said network of servers comprising the steps of:

(a) providing a shared multi-user virtual environment comprising a first entity, a second entity and a third entity, wherein said first, second and third entities each respectively represents a first client, a second client, and a third client within said shared multi-user virtual environment, and wherein said first, second and third clients are physically connected to said servers of said network;

(b) said network of servers providing spatial information of said first, second and third entities, said spatial information representative of a location of said first, second and third entities within said shared multi-user virtual environment;

(c) determining a first aura, a second aura and a third aura for each of said first, second and third entities, wherein each of said auras comprises a predetermined area surrounding a respective one of said first, second and third entities;

(d) grouping said first entity and said second entity to form a first interaction group provided said first entity and said second entity have overlapping auras;

(e) provided said third aura of said third entity does not overlap with said first and second auras, forming a second interaction group with said third entity;

(f) distributing computational load among said network of servers by mapping said first interaction group and said second interaction group to a respective one of said network of servers.

9. The computer implemented method as recited in claim 8 wherein said step (d) further comprises the steps of:

computing a distance between said first entity and said second entity in said share multi-user virtual environment; and assigning said first entity and said second entity to said first interaction group provided said distance is smaller than a predetermined threshold.

10. The computer implemented method as recited in claim 8 further comprising the steps of:

replicating said first entity at a first server of said network provided that said first interaction group is mapped to said first server and provided further that said first client is not physically connected to said first server; and replicating said second entity at said first server provided said second client is not physically connected to said first server.

11. The computer implemented method as recited in claim 8 further comprising the step of maintaining consistency between said interaction groups and changes in said shared multi-user virtual environment by repeating said steps (b) to (f) at a predetermined interval.

12. The computer implemented method as recited in claim 11 wherein said predetermined interval is user-adjustable.

13. The computer implemented method as recited in claim 8 wherein said step (f) further comprises the steps of:

mapping said, first interaction group to a first server of said network provided said first server has a lower computation load than said second server; and mapping said first interaction group to a second server of said network provided said second server has a lower computation load than said first server.

14. The computer implemented method as recited in claim 8 wherein said step (f) further comprises the steps of:

mapping said first interaction group to a first server of said network provided said first client and said second client are physically connected to said first server; and mapping said second interaction group to a second server of said network provided said third client is physically connected to said second server.

15. A distributed virtual reality computer system implemented on a network of servers, said distributed virtual reality computer system comprising:

means for providing a shared multi-user virtual environment comprising a plurality of entities, wherein said entities each represents one of a plurality of clients within said shared multi-user virtual environment, and wherein said plurality of clients are physically connected to said network of servers; and means for dynamically assigning each of said entities to a server of said network, said means for dynamically assigning further comprising:

(a) means for periodically collecting spatial information of said plurality of entities from said network of servers, said spatial information comprising a location of each entity within said shared multi-user virtual environment;

(b) means for forming a plurality of interaction groups by periodically grouping said plurality of entities based on said spatial information; and (c) means for distributing computational load among said network of servers by periodically mapping each interaction group to a respective one of said network of servers.

16. The distributed virtual reality system as recited in claim 15 wherein said means for forming further comprises:

means for determining an aura surrounding each one of said plurality of entities; and means for assigning entities having overlapping auras to a same interaction group.

17. The distributed virtual reality system as recited in claim 16 further comprising means for increasing a number of said plurality of interaction groups by decreasing a size of said aura.

18. The distributed virtual reality system as recited in claim 15 wherein said means for forming further comprises:

means for computing a distance between a first entity and a second entity of said plurality in said shared multi-user virtual environment;

means for assigning said first entity and said second entity to a same interaction group provided said distance is smaller than a predetermined threshold; and means for assigning a third entity of said plurality to said same interaction group provided a distance between said second entity and said third entity is smaller than a predetermined threshold.

19. The distributed virtual reality system as recited in claim 15 further comprising means for replicating non-local entities of one interaction group of said plurality at a corresponding one of said servers.

20. The distributed virtual reality system as recited in claim 15 wherein said means for distributing further comprises:

means for determining computation loads for said servers; and means for assigning said interaction groups to said servers according to said computation loads.

21. The distributed virtual reality system as recited in claim 15 wherein said means for distributing further comprises means for mapping one interaction group to a selected one of said plurality of servers provided said selected server is directly connected to clients associated with said one interaction group.

* * * * *